(12) United States Patent
Nortier et al.

(10) Patent No.: US 6,460,825 B1
(45) Date of Patent: Oct. 8, 2002

(54) ADJUSTMENT FOR PISTON-STYLE FLUSH VALVE

(75) Inventors: Richard A. Nortier, Westchester; Steven R. Oliver, Chicago, both of IL (US)

(73) Assignee: Sloan Valve Company, Franklin Park, IL (US)

( * ) Notice: Subject to any disclaimer, the term of this patent is extended or adjusted under 35 U.S.C. 154(b) by 0 days.

(21) Appl. No.: 09/852,409

(22) Filed: May 11, 2001

(51) Int. Cl.[7] ............................................. F16K 31/12
(52) U.S. Cl. ............................ 251/42; 251/40; 251/285
(58) Field of Search ............................. 251/42, 40, 285

(56) References Cited

U.S. PATENT DOCUMENTS

| 1,959,955 | A | * | 5/1934 | Hedges | 251/22 |
| 2,007,652 | A | * | 7/1935 | Kocour | 251/40 |
| 2,087,049 | A | * | 7/1937 | Shanley | 251/40 |
| 2,734,712 | A | * | 2/1956 | Fraser | 251/42 |
| 3,012,751 | A | * | 12/1961 | Hauser | 251/285 |
| 3,166,289 | A | * | 1/1965 | Engstrom | 251/43 |
| 4,135,696 | A | * | 1/1979 | Saarem et al. | 251/42 |

* cited by examiner

Primary Examiner—Lesley D. Morris
Assistant Examiner—John Bastianelli
(74) Attorney, Agent, or Firm—Cook, Alex, McFarron, Manzo, Cummings & Mehler, Ltd.

(57) ABSTRACT

A flush valve includes a body having an inlet and an outlet and a valve seat at the outlet. There is a piston assembly movable in the body toward and away from the valve seat to control flow from the inlet through the outlet. A pressure chamber is formed in the body above the piston assembly, at least in part by a cover attached to the body. Pressure in the pressure chamber normally maintains the piston assembly closed upon the valve seat. There is a relief valve in the piston assembly for venting the pressure chamber to the outlet, permitting the piston assembly to move away from the valve seat to open flow through the outlet. There is an adjustment assembly located in the flush valve cover which permits adjustment of piston assembly stroke. The adjustment assembly includes a housing mounted in the cover, a sleeve axially movable in the housing, and an adjustment element for causing movement of the sleeve.

11 Claims, 2 Drawing Sheets

ADJUSTMENT FOR PISTON-STYLE FLUSH VALVE

THE FIELD OF THE INVENTION

The present invention relates to flush valves for use in connection with toilet devices such as urinals and water closets, and more specifically, to a piston-type flush valve. More particularly, the invention relates to an improved adjustment assembly mounted in the flush valve cover to provide for adjustment of the stroke of the piston assembly, which stroke in turn determines the amount of water which will flow through the flush valve in a single operation.

In prior flush valves of the piston type manufactured by Sloan Valve Company of Franklin Park, Ill., the assignee of the present invention, there was a stainless steel plug mounted in the flush valve cover with a leather packing and a packing nut to create a seal. Problems developed in the field from water leaking past the packing due in part to poor surface finish on the plug. Further, it was extremely difficult to replace the packing in the field and packing was considered to be very old sealing technology.

The flush valve of the present invention may be used in a sea water environment and thus it is important to insure that there are no areas exposed to water wherein contaminants from sea water can concentrate and cause deterioration of the metal. The present invention provides an adjustment means which eliminates small crevices in the adjustment components and high sealing stresses at metal interfaces.

The adjustment assembly is essentially vandalproof in that even though an individual may obtain access to the adjustment assembly by removing the cap in the cover, excessive rotation of the adjustment member will simply cause frangible tabs to be broken which will prevent further adjustment, but will not prevent the seal of the adjustment assembly from remaining intact and effective.

SUMMARY OF THE INVENTION

The present invention relates to piston-type flush valves for use with urinals and water closets, and more specifically, to an improved assembly for adjusting stroke of the flush valve piston.

A primary purpose of the invention is to provide an adjustment, simple in construction and reliable in operation, for the stroke of the piston assembly which determines the volume of water which flows through the flush valve when operated.

Another purpose of the invention is to provide an adjustment as described which is essentially vandalproof.

Another purpose of the invention is to provide an adjustment for the stroke of a flush valve piston which eliminates the potential for leakage through the flush valve cover where the adjustment assembly is mounted.

Another purpose of the invention is to provide an adjustment assembly as described wherein if excess torque is applied to the adjustment element, anti-rotation tabs will shear prior to the adjustment threads being stripped.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The present invention relates to flush valves for use with urinals and water closets, and more specifically, to a valve sold by Sloan Valve Company of Franklin Park, Ill., under the trademark NAVAL. This valve utilizes a piston assembly to control flow between the flush valve inlet and outlet. More specifically, the invention relates to an improvement in the mechanism for adjusting the stroke of the piston assembly, which stroke determines the volume of water which will flow between the inlet and the outlet during a single flushing operation.

The adjustment assembly is located within the cover which is mounted on the flush valve body. There is a cap on the cover which normally hides the adjustment assembly and the cap must be removed before adjustment can take place. Adjustment is effected by rotation of a screw which is a part of the adjustment assembly, with such rotation causing axial movement of a slidable sleeve, with the inner surface of the sleeve forming a stop to control the length of the piston assembly stroke. The sleeve and the housing within which it is mounted have interlocking frangible elements or anti-rotation tabs which shear off before the threads on the adjustment screw strip. Further, the relationship between the adjustment screw and the flush valve cover is such that the screw cannot be removed, preventing a potential vandalism problem.

Figure 1:
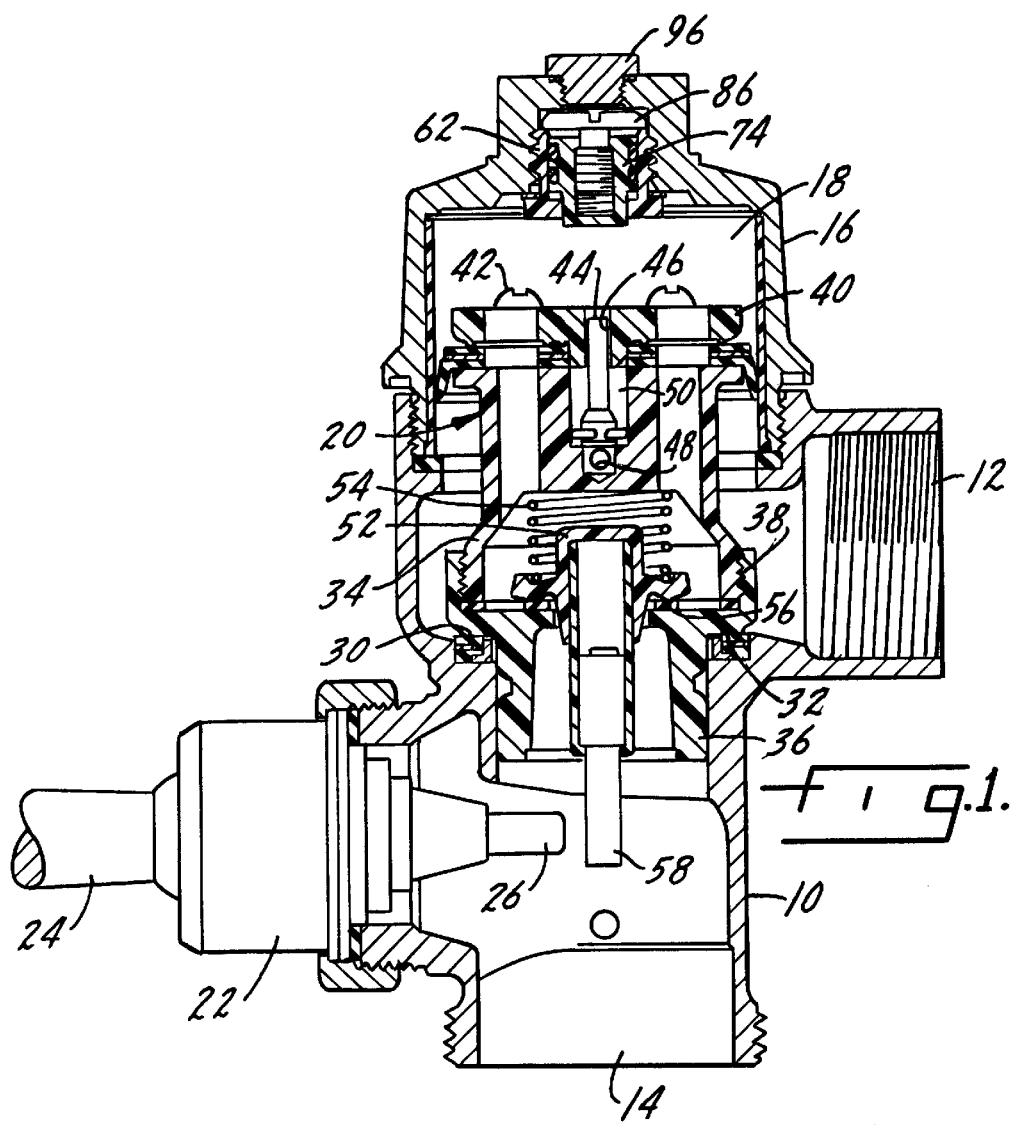
FIG. 1 is a partial axial section through a flush valve of the type described.

In FIG. 1, the flush valve body is indicated at 10 and has an inlet 12 and an outlet 14. There is a top cover 16 which is threadedly attached to the body 10 and defines a pressure chamber 18 positioned above a piston assembly indicated generally at 20.

Adjacent to the outlet 14 there is a handle assembly 22 which has a conventional manual handle 24 which when activated will move an interior plunger 26 which will cause the relief valve of the piston assembly to move off its seat to initiate the flushing cycle. This is conventional in valves of this type.

The body 10 includes a valve seat 30, with the piston assembly 20 having a surface 32 which closes upon the valve seat to prevent flow between the inlet 12 and the outlet 14.

The piston assembly 20 includes a piston 34 and a guide 36 threadedly attached thereto, as at 38. The piston assembly has a top plate 40 mounted by screws 42 to the piston 34. A rod 44 moves within a passage 46 in the top plate 40 to control the flow of water from an opening 48 in the piston 34. The opening 48 is connected to the inlet 12 and water will flow through the opening 48 into a chamber 50 around the rod and then outwardly through the passage 46 into the pressure chamber 18. The space between rod 44 and passage 46 functions as the bypass orifice. Water within the pressure chamber 18 maintains the piston assembly on its valve seat 30 to close flow between the inlet and outlet.

There is a relief valve 52, biased by a spring 54, onto a relief valve seat 56. The relief valve has a stem 58 which extends downwardly into the body 10 and is positioned adjacent the plunger 26. In operation, when the handle is moved, the plunger will move into the body 10 causing the relief valve to tilt off its seat, permitting the pressure chamber 18 to vent through the outlet 14 and permitting the piston assembly to thereby move up off its seat so that there is direct flow between the inlet and the outlet. As is known in the art, flow through the bypass orifice into the pressure chamber 18 causes the piston to return to its valve seat. The duration of flow through the bypass orifice controls the time during which the piston is off the valve seat and thus the volume of flow through the flush valve. The time which water will flow through the bypass orifice 18 is determined by the stroke of the piston or its length of travel before the rod 44 can initiate its function of controlling the flow of water through the bypass orifice into the pressure chamber.

Figures 2, 3:
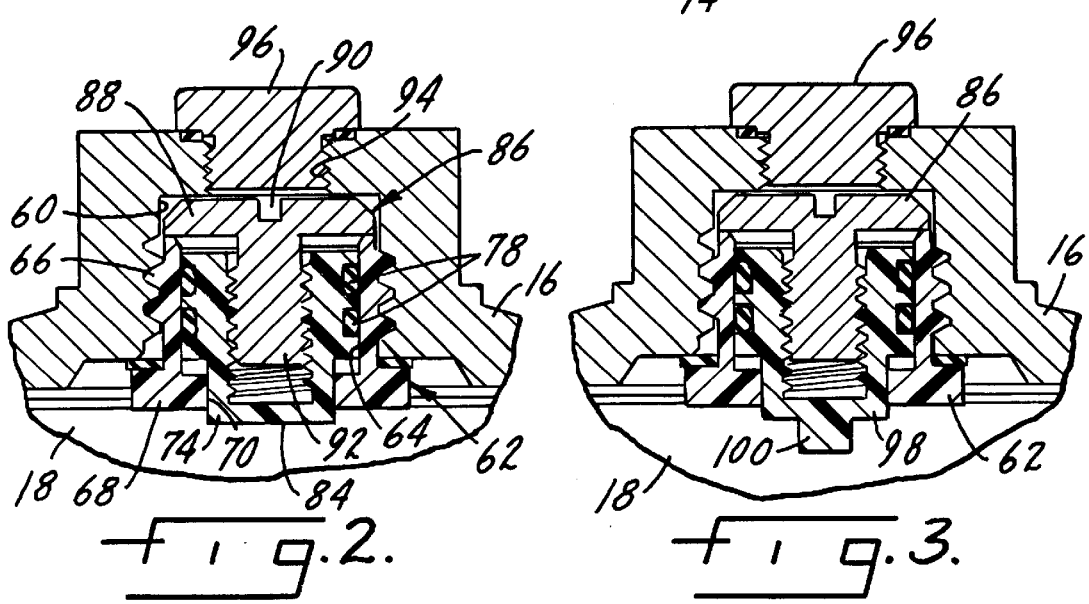
FIG. 2 is an enlarged partial section through one embodiment of adjustment assembly.
FIG. 3 is an enlarged partial section, similar to FIG. 2, showing a second embodiment of adjustment assembly.
Figure 4:
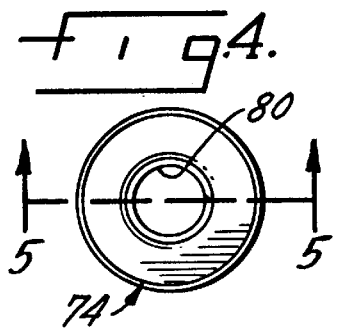
FIG. 4 is a top view of the first embodiment adjustment assembly sleeve.
Figure 11:
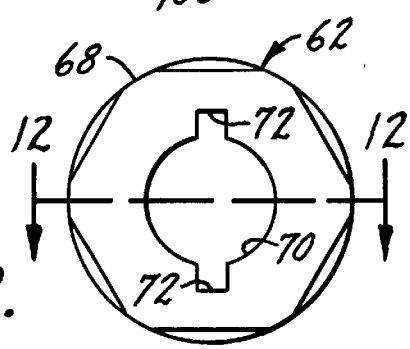
FIG. 11 is a bottom view of the adjustment assembly housing.
Figure 12:
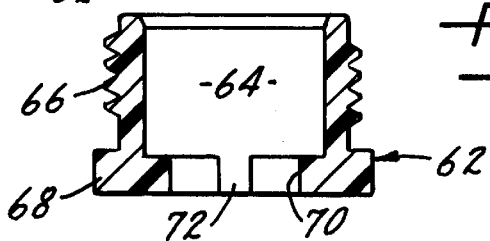
FIG. 12 is a section along plane 12—12 of FIG. 11.

Focusing specifically on FIG. 2, the cover 16 has a recess 60 within which is threadedly mounted an adjustment assembly housing 62. The housing 62 is illustrated in detail in FIGS. 11 and 12 and includes a central chamber 64, exterior threads 66, and a bottom 68 having a central circular opening 70 and two diametrically opposed slots 72 which open into the opening 70.

Positioned within the chamber 64 of the housing 62 is an adjustment sleeve 74, which in the FIG. 2 embodiment, is detailed in FIGS. 4–7. The adjustment sleeve exterior wall has a pair of grooves 76 within which are positioned seal rings 78. The interior of the sleeve 74 is threaded, as at 80. At the bottom of the sleeve 74 are a pair of frangible tabs or anti-rotation tabs 82 which are formed and adapted to interlock with the slots 72 in the bottom 68 of the housing 62. The bottom surface 84 of the sleeve 74 extends through opening 70 and functions as a stop limiting movement of the piston 34 to thereby control the stroke of the piston and thus the time between initiation of flush valve operation and the beginning of the refill cycle through the bypass orifice. The position of the surface 84, or the stop on the adjustment assembly, determines the stroke of the piston and even very slight variations in the position of the stop surface can have substantial effect on the volume of water which flows through the flush valve in a single operating cycle. Adjustment of stroke adjusts refill time and if the stroke is shorter, the refill cycle will be shorter, which in turn will decrease the volume of water which flows through the flush valve in a single operation.

Threadedly mounted within the sleeve 74 is an adjustment screw 86 having a cap 88 with a tool receiving opening 90. The screw 86 has a shank 92 which is threaded to match the threads 80 of the sleeve. Rotation of the screw 86 causes axial sliding movement of the sleeve 74 within the housing 62 to control the position of the stop surface 84. The tabs 82 prevent sleeve rotation relative to housing 62 when screw 86 is turned.

It is important to note that the adjustment screw cannot be removed once the cover 16 is in place. The head 88 of the screw is larger than the opening 94 for the cap 96. Thus, even though the cap 96 for controlling access to the adjustment screw 86 has been removed, it is impossible to remove the adjustment screw without first removing the cover 16. This prevents vandalism and potential leakage through the cover of the flush valve.

In operation, when it is desired to adjust stroke of the piston, the cap 96 will be removed and the adjustment screw will be rotated which will cause axial movement of the sleeve 74. If excessive torque is applied to the adjustment screw, the anti-rotation tabs 82 of the sleeve will shear off before the threads on the adjustment screw will strip. This eliminates the potential for cracking the sleeve and creating a leakage path. The valve may lose its adjustability until the adjustment assembly is replaced, but the valve will not leak.

Figure 8:
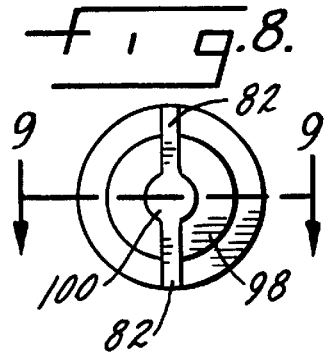
FIG. 8 is a bottom view of the second embodiment of adjustment assembly sleeve.
Figure 5:
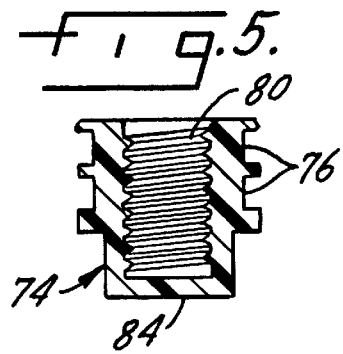
FIG. 5 is a section along plane 5—5 of FIG. 4.
Figure 9:
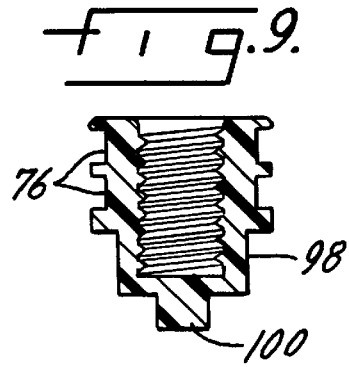
FIG. 9 is a section along plane 9—9 of FIG. 8.
Figure 6:
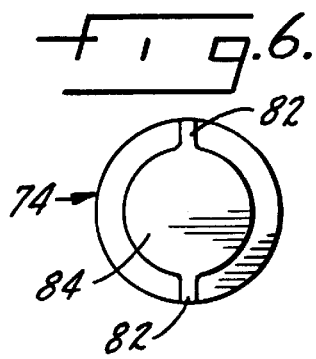
FIG. 6 is a bottom view of the sleeve of FIGS. 4 and 5.
Figure 10:
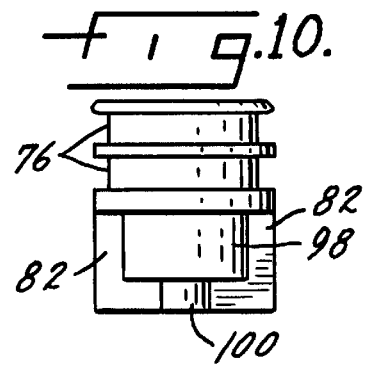
FIG. 10 is a side view of the adjustment sleeve of FIGS. 8 and 9.
Figure 7:
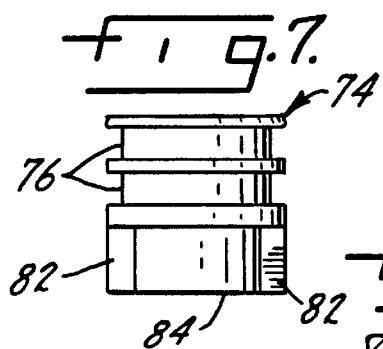
FIG. 7 is a side view of the sleeve of FIGS. 4, 5 and 6.

FIGS. 8, 9 and 10 show a modified form of sleeve which has been designated at 98. The sleeve 98 is the same as the sleeve 62, except that the stop surface has an inwardly-extending projection 100, which projection extends further into the pressure chamber than the surface 84 and thus provides a means for further shortening the stroke of the flush valve piston.

Whereas the preferred form of the invention has been shown and described herein, it should be realized that there may be many modifications, substitutions and alterations thereto.

The embodiments of the invention in which an exclusive property or privilege is claimed are as follows:

1. A flush valve including a body having an inlet and an outlet, a valve seat at said outlet, a piston assembly movable in said body toward and away from said valve seat to control flow from said inlet through said outlet, a pressure chamber in said body above said piston assembly and normally maintaining said piston assembly closed upon said valve seat, a cover on said body defining, at least in part, said pressure chamber, said piston assembly including a refill orifice connecting said chamber with said body inlet, a relief valve in said piston assembly for venting said chamber causing said piston assembly to move away from said valve seat to open flow through said outlet, and means for adjusting stroke of said piston assembly in its movement toward and away from said valve seat, said adjusting means including an assembly positioned in said cover in alignment with said piston assembly and having a housing, a sleeve axially movable in said housing and positioned for contact by said piston assembly, and an adjustment element for causing movement of said sleeve.

2. The flush valve of claim 1 wherein said adjustment element includes a screw having a tool receiving opening on an upper surface thereof.

3. The flush valve of claim 1 wherein said adjustment means housing is threadedly mounted into said cover.

4. The flush valve of claim 1 wherein said sleeve has a generally flat bottom surface facing said piston assembly.

5. The flush valve of claim 1 wherein said sleeve has an axial projection extending into said pressure chamber for contact by said piston assembly.

6. The flush valve of claim 1 further including seal means positioned between an outer surface of said sleeve and an inner surface of said housing.

7. The flush valve of claim 1 wherein said sleeve and housing include cooperating means thereon, preventing rotation of said sleeve relative to said housing, but permitting axial movement of said sleeve.

8. The flush valve of claim 7 wherein said cooperating means include outwardly extending projections on said sleeve and mating slots on said housing.

9. The flush valve of claim 8 wherein said outwardly extending projections are frangible.

10. The flush valve of claim 1 including a cap removably mounted in said cover and normally covering said adjustment element.

11. The flush valve of claim 10 wherein said cover has an opening for said cap, said cover opening being smaller in size than the largest portion of said adjustment element.

* * * * *